(12) United States Patent
Wright et al.

(10) Patent No.: US 12,400,628 B2
(45) Date of Patent: Aug. 26, 2025

(54) EVENT MASKING

(71) Applicant: Nokia Technologies Oy, Espoo (FI)

(72) Inventors: Christopher Wright, London (GB); David Duffy, Zurich (CH); Harm Cronie, Echallens (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/634,707

(22) PCT Filed: Aug. 4, 2020

(86) PCT No.: PCT/IB2020/057369
§ 371 (c)(1),
(2) Date: Feb. 11, 2022

(87) PCT Pub. No.: WO2021/028780
PCT Pub. Date: Feb. 18, 2021

(65) Prior Publication Data
US 2022/0301535 A1   Sep. 22, 2022

(30) Foreign Application Priority Data
Aug. 14, 2019 (EP) .................... 19191702

(51) Int. Cl.
*G10K 11/175* (2006.01)
*G06F 3/16* (2006.01)

(52) U.S. Cl.
CPC ............... *G10K 11/1752* (2020.05)

(58) Field of Classification Search
CPC .. G10K 11/1752; G10K 11/175; G06Q 10/06; G06Q 10/06311; G06Q 10/0631; G06Q 50/18; G06F 1/3231; G06F 3/011; G06F 3/016; G06F 3/165; G06F 3/167; G06F 9/542; G06F 11/00; G06F 11/004;
(Continued)

(56) References Cited

U.S. PATENT DOCUMENTS

| 7,181,027 B1 | 2/2007 | Shaffer et al. |
| 10,061,312 B1 | 8/2018 | Anderson |

(Continued)

FOREIGN PATENT DOCUMENTS

| CN | 107406081 A | 11/2017 |
| CN | 107609671 A | 1/2018 |

(Continued)

OTHER PUBLICATIONS

Sheng Shen, et al. "MUTE: Bringing IoT to Noise Cancellation", Conference Paper, SIGCOMM'18, Budapest, Hungary, 2018 Association for Computing Machinery, pp. 1-15, Aug. 20, 2018.*

(Continued)

*Primary Examiner* — Leshui Zhang
(74) *Attorney, Agent, or Firm* — Alston & Bird LLP (57) ABSTRACT

An apparatus, method and computer program is described for detecting a pre-event signature based on sensor data, wherein the pre-event signature is indicative of a prediction of a first event; determining an event masking action corresponding to the first event; and causing performance, in response to the detection of the pre-event signature, of the event masking action for masking the first event.

20 Claims, 9 Drawing Sheets

(58) Field of Classification Search
CPC ...... G06F 11/006; G06F 11/008; G06F 11/07; G06F 11/30; G06F 11/36; H04N 7/18; G10L 15/22; G07C 5/008; G07C 5/0808; G06N 20/20; G01D 9/005; A61F 11/06; A61B 5/4806; A61B 5/4812; A61B 5/165
USPC .... 381/73.1, 71.1–71.14, 61, 66, 72, 74, 79, 381/80, 81, 82, 85, 86, 334, 92, 93, 381/94.1–94.9, 95, 111–115, 118, 119, 381/122, 123; 700/94; 379/406.01–406.16; 455/569.1, 570; 706/15, 16, 18, 21, 22, 23, 24; 704/226, 704/232, 233
See application file for complete search history.

(56) References Cited

U.S. PATENT DOCUMENTS

| | | | |
|---|---|---|---|
| 2006/0116874 A1* | 6/2006 | Samuelsson | G10L 19/26 704/228 |
| 2008/0071713 A1* | 3/2008 | Tung | H04B 1/1615 706/21 |
| 2010/0172510 A1 | 7/2010 | Juvonen | |
| 2013/0332156 A1* | 12/2013 | Tackin | H03G 3/3005 704/226 |
| 2015/0332585 A1 | 11/2015 | H.M et al. | |
| 2016/0063997 A1 | 3/2016 | Nemala et al. | |
| 2016/0257305 A1 | 9/2016 | Riviere-Cazaux | |
| 2016/0284333 A1 | 9/2016 | Weston | |
| 2018/0060665 A1* | 3/2018 | Song | G08B 31/00 |
| 2018/0270549 A1* | 9/2018 | Awiszus | A62B 27/00 |
| 2019/0342339 A1* | 11/2019 | Nanda | G06F 21/62 |

FOREIGN PATENT DOCUMENTS

| | | |
|---|---|---|
| EP | 3005344 A1 | 4/2016 |
| WO | 2014/191798 A1 | 12/2014 |

OTHER PUBLICATIONS

Shen et al., "Mute: Bringing IoT to Noise Cancellation", Proceedings of the 2018 Conference of the ACM Special Interest Group on Data Communication, Aug. 2018, 15 pages.
"App Fatigue in Smart Homes and Smart Apartments", iot for all, Retrieved on Jan. 20, 2022, Webpage available at : https://www.iotforall.com/app-fatigue-smart-home-iot.
"Hacking The Aether: How Data Crosses The Air-Gap", Hackaday, Retrieved on Jan. 20, 2022, Webpage available at : https://hackaday.com/2017/02/02/hacking-the-aether/.
Genkin et al., "RSA Key Extraction via Low-Bandwidth Acoustic Cryptanalysis", Acoustic cryptanalysis, Journal of Cryptology, Dec. 18, 2013, pp. 1-57.
Genkin et al., "ECDSA Key Extraction from Mobile Devices via Nonintrusive Physical Side Channels", ACM Conference on Computer and Communications Security, Aug. 18, 2016, pp. 1-23.
"What's Next for Smart Speakers? Smarter Microphones", semi, Retrieved on Jan. 20, 2022, Webpage available at : https://www.semi.org/en/blogs/technology-trends/whats-next-for-smart-speakers-smarter-microphones.
Duong et al., "Audio Zoom for Smartphones Based on Multiple Adaptive Beamformers", 13th International Conference on Latent Variable Analysis and Signal Separation, Feb. 2017, 6 pages.
"The promise of AI in audio processing", towards data science, Retrieved on Jan. 20, 2022, Webpage available at : https://towardsdatascience.com/the-promise-of-ai-in-audio-processing-a7e4996eb2ca.
"RNNoise: Learning Noise Suppression", xiph.org, Retrieved on Jan. 20, 2022, Webpage available at : https://mvalin.ca/demo/mnoise/.
"Method to cancel noise without ear-blocking headphones", Science Daily, Retrieved on Jan. 20, 2022, Webpage available at : https://www.sciencedaily.com/releases/2018/08/180824180952.htm.
"This new Alexa skill will play music generated by artificial intelligence", The Verge, Retrieved on Jan. 20, 2022, Webpage available at : https://www.theverge.com/2018/3/14/17120588/deepmusic-alexa-skill-ai-generated-music.
Davis et al., "The Visual Microphone: Passive Recovery of Sound from Video", ACM Transactions on Graphics, vol. 33, No. 4, Jul. 2014, 10 pages.
"Sony's latest smartphone camera sensor can shoot at 1,000fps", The Verge, Retrieved on Jan. 20, 2022, Webpage available at : https://www.theverge.com/circuitbreaker/2017/2/7/14532610/sony-smartphone-camera-sensor-1000-fps.
"Israeli startup Noveto promises a world without headphones", Israel 21c, Retrieved on Jan. 20, 2022, Webpage available at : https://www.israel21c.org/israeli-startup-noveto-promises-a-world-without-headphones/.
"This could be the last year you'll want to buy headphones—a new audio technology is coming in 2019 that could make them obsolete", Business Insider, Retrieved on Jan. 20, 2022, Webpage available at : https://www.businessinsider.n/tech/this-could-be-the-last-year-youll-want-to-buy-headphones-a-new-audio-technology-is-coming-in-2019-that-could-make-them-obsolete/articleshow/64768320.cms.
Extended European Search Report received for corresponding European Patent Application No. 19191702.0, dated Feb. 12, 2020, 8 pages.
International Search Report and Written Opinion received for corresponding Patent Cooperation Treaty Application No. PCT/IB2020/057369, dated Sep. 7, 2020, 12 pages.
Office action received for corresponding Indian Patent Application No. 202247012528, dated Jul. 28, 2022, 6 pages.
Office action received for corresponding European Patent Application No. 19191702.0, dated Oct. 18, 2022, 4 pages.
Office Action for European Application No. 19191702.0 dated Oct. 31, 2023, 4 pages.
Office Action for Chinese Application No. 202080057355.8 dated Jun. 21, 2024, 13 pages.
Office Action for European Application No. 19191702.0 dated Jul. 22, 2024, 3 pages.
Office Action for Chinese Application No. 202080057355.8 dated Mar. 21, 2025, 17 pages.
Decision to grant a European patent Mailed on May 30, 2025 for EP Application No. 19191702, 2 page(s).

\* cited by examiner

EVENT MASKING

RELATED APPLICATION

This application claims priority to PCT Application No. PCT/IB2020/057369, filed on Aug. 4, 2020, which claims priority benefit from EP Application Serial No. 19191702.0 filed Aug. 14, 2019, the contents of which are incorporated herein by reference in their entirety.

FIELD

The present specification relates to event masking; for example, masking an event that may not be desirable.

BACKGROUND

Noises or similar events may be masked, for example, with white noise. There remains a need for further developments in this field.

SUMMARY

In a first aspect there is provided an apparatus comprising: means for detecting a pre-event signature based on sensor data, wherein the pre-event signature is indicative of a prediction of a first event; means for determining an event masking action corresponding to the first event; and
    means for causing performance, in response to the detection of the pre-event signature, of the event masking action for masking the first event.

Also disclosed is an apparatus comprising at least one processor; and at least one memory including computer program code, the at least one memory and the computer program configured, with the at least one processor, to cause the apparatus to: detect a pre-event signature based on sensor data, wherein the pre-event signature is indicative of a prediction of a first event; determine an event masking action corresponding to the first event; and cause performance, in response to the detection of the pre-event signature, of the event masking action for masking the first event.

In a second aspect there is provided a method comprising: detecting a pre-event signature based on sensor data, wherein the pre-event signature is indicative of a prediction of a first event; determining an event masking action corresponding to the first event; and causing performance, in response to the detection of the pre-event signature, of the event masking action for masking the first event.

In a third aspect there is provided a computer program comprising instructions for detecting a pre-event signature based on sensor data, wherein the pre-event signature is indicative of a prediction of a first event; determining an event masking action corresponding to the first event; and causing performance, in response to the detection of the pre-event signature, of the event masking action for masking the first event.

Also disclosed is a computer readable medium having stored thereon computer-readable instructions for detecting a pre-event signature based on sensor data, wherein the pre-event signature is indicative of a prediction of a first event; determining an event masking action corresponding to the first event; and causing performance, in response to the detection of the pre-event signature, of the event masking action for masking the first event.

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Figure 1:
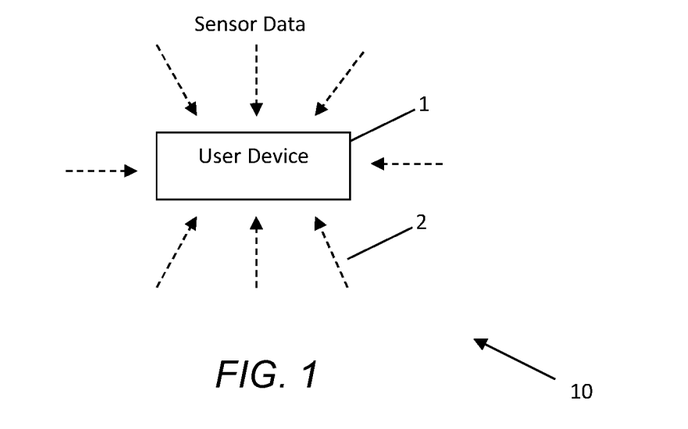
FIG. 1 is a block diagram of an example system.

FIG. 1 is a block diagram of an example system, indicated generally by the reference numeral 10. System 10 comprises a user device 1 that receives sensor data 2 from one or more sensors. At least one of the one or more sensors may be comprised within the user device 1. Alternatively, or in addition, at least one of the one or more sensors may be external sensors, for example, comprised within one or more external devices. The sensor data 2 may comprise one or more of visual data, audible data, haptic data, motion data, radiofrequency data, environmental data (e.g. temperature, humidity, etc.) or the like. The user device 1 may analyse the sensor data 2 in order to predict an occurrence of an event. This is explained in further detail below.

In day to day life, there are many events, such as a loud noise, or a sudden bright light, that may cause disturbance. It may not be possible to prevent the occurrence of such events. The example embodiments describe how these events may be masked in order to, for example, reduce the perception of the events by one or more users.

Figure 2:
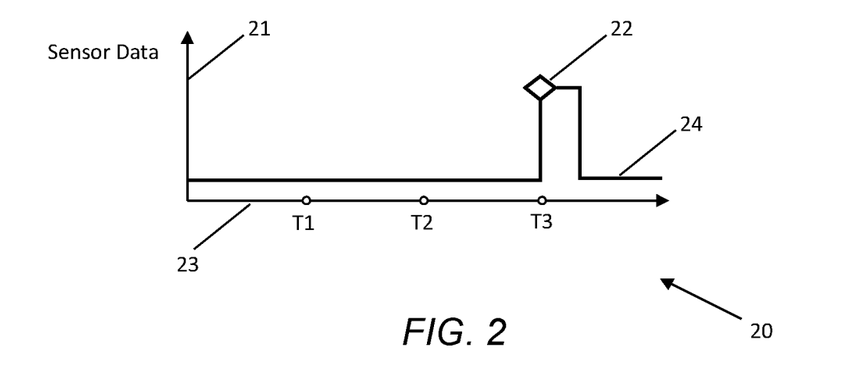
FIGS. 2 to 4 are plots of sensor data in accordance with example embodiments.

FIG. 2 is a plot of sensor data, the plot indicated generally by the reference numeral 20, in accordance with an example embodiment. The plot 20 shows a sensor data axis 21 and a time axis 23. The plot 20 further comprises a first sensor data plot 24. The first sensor data plot 24 shows signals corresponding to a first event 22. The first event 22 may be a disruptive event that may cause disturbance to one or more users. The first sensor data plot 24 shows an occurrence of a first event 22 at time T3. The sensor data, as described above, may comprise visual data, audible data, haptic data, motion data, environmental data, or any other data that may be sensed by the one or more sensors. For example, when the first event 22 is an audible event, the sensor data may comprise audio signals. The audible event may be a disruptive or loud noise that may cause disturbance to one or more users. The one or more users may be, for example, be humans or animals (such as pets). In another example, the one or more users may comprise a device that operates based on voice commands. For example, loud noise may cause such a voice operated device to perform an action in response to the loud noise (for example, output a notification that it does not understand the loud noise, or associate the loud noise with an input command), which may be undesirable. In other examples, the first event 22 may be one or more of a visual event, audible event, environmental event, haptic event, or any other event that may cause disturbance to one or more users.

Figure 3:
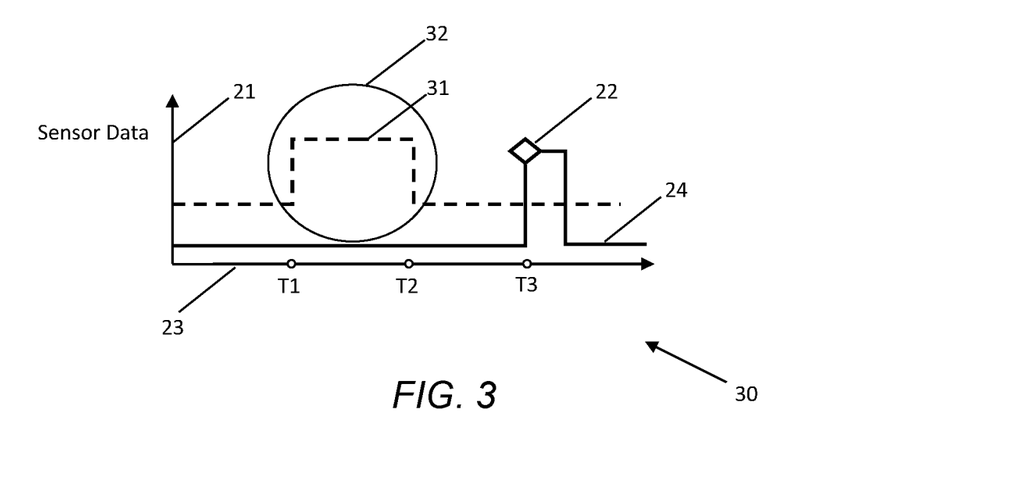

FIG. 3 is a plot of sensor data, the plot indicated generally by the reference numeral 30, in accordance with an example embodiment. The plot 30 shows the sensor data axis 21, the time axis 23, and first sensor data plot 24, and the first event 22, as shown in FIG. 2. The plot 30 further comprises a second sensor data plot 31. The second sensor data plot 31 may be based on second sensor data that may be received prior to the first event 22. The second sensor data, may, for example, be received as a signal. The second sensor data received prior to the first event 22 may be analysed for recognizing or detecting one or more pre-event signatures 32 that are indicative of a prediction of the first event 22. For example, a second sensor data signature may comprise the rise in the second sensor data at T1, and a fall in the second sensor data at T2. The second sensor data signature may be comprised within the pre-event signature 32 corresponding to the first event 22. Therefore, when the second sensor data signature is recognized or detected, it may be determined that the first event 22 is predicted to occur. For example, with reference to time T3 (the starting time of the first event 22), time T1 may be two minutes before time T3, and time T2 may be one minute before time T3. A pre-event signature 32 may therefore indicate that approximately two minutes after a start (rising edge) of the second sensor data, the first event 22 is predicted to occur. Alternatively, or in addition, the first event 22 may be predicted to occur approximately one minute after an end (falling edge) of the second sensor data. Alternatively, or in addition, the first event 22 may be predicted to occur when the second sensor data plot 31 shows that there is a rise in the second sensor data and a fall in the second sensor data in less than one minute after the rise in the second sensor data; and the first event 22 may be predicted to occur approximately one minute after the fall in the second sensor data. Alternatively, or in addition, the first event 22 may be predicted to occur approximately one minute and thirty second after the second sensor data has been high for at least thirty seconds.

As such, the pre-event signature 32 may comprise one or more parameters associated with sensor data from one or more sensors. The parameters may include one or more of timing, frequency, amplitude, or the like, of the sensor data and/or a signal associated with the sensor data. For example, when the sensor data comprises an audible sensor data (for example from audible sensors such as microphones), the parameters may comprise one or more of the timing (e.g. start or finish, rising or falling edge, etc.), frequency (e.g. pitch), and amplitude (e.g. loudness) of the audible sensor data. In another example, when the sensor data comprises a visual sensor data, such as a light, the parameters may comprise one or more of the timing (e.g. start or finish of light being on or off, rate of light flashing, number of light flashes, etc.), frequency (e.g. colour of the light), wavelength (e.g. position on the electromagnetic spectrum; visible or not visible to naked eye), and amplitude (e.g. intensity or brightness of the light).

For example, the first event 22 may be an audible event, such as a sound made by a heater, for example as the materials of the heater expand during heating. The sound from the heater may be a disruptive noise, and may cause disturbance to one or more users (for example, if someone is sleeping). A light of the heater may turn on a threshold time before the first event 22, that is, a threshold time before the heater makes a disruptive sound. For example, the threshold time may be thirty seconds. Therefore, the second sensor data plot 31 may show visual sensor data captured from the light of the heater. A pre-event signature for the first event 22 (sound from the heater) may therefore comprise the second sensor data signature, which second sensor data signature is the turning on of the light thirty seconds before the first event 22. As described above, the pre-event signature 32 may comprise one or more parameters associated with the second sensor data (shown by the second sensor data plot 31), where the parameters may comprise one or more of timing, frequency, amplitude, or the like. For example, the second sensor data signature may be defined such that the first event 22 is predicted to occur thirty seconds after the light turns on, and when the light of the heater is a red light (e.g. the second sensor data has frequency (430-480 THz) and/or wavelength (700-635 nm) associated with red light), and when the light has a brightness above a threshold brightness (e.g. amplitude and/or intensity is above a threshold amplitude and/or intensity). For example, if a green light is turned on, the second sensor data signature (associated with red light) is not detected, and therefore the pre-event signature is not detected. As the pre-event signature is not detected, the first event 22 may not be predicted to occur.

Figure 4:
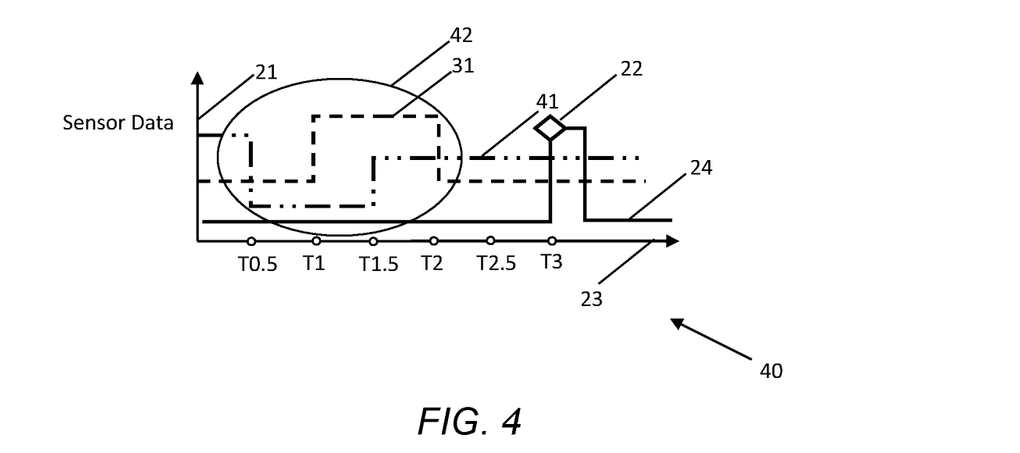

FIG. 4 is a plot of sensor data, the plot indicated generally by the reference numeral 40, in accordance with an example embodiment. The plot 40 shows the sensor data axis 21, the time axis 23, the first sensor data plot 24, the first event 22, and the second sensor data plot 31, as shown in FIG. 2. The plot 40 further comprises a third sensor data plot 41. The second sensor data plot 31 and the third sensor data plot 41 may respectively be based on second sensor data and third sensor data that may be received prior to the first event 22. The second sensor data and the third signal data, may, for example, be received as a second signal and a third signal respectively. The second sensor data and the third sensor data received prior to the first event 22 may be analysed for determining one or more pre-event signatures 42 that are indicative of a prediction of the first event 22. For example, a third sensor data signature may comprise the fall in the third sensor data at T0.5, and a rise in the third sensor data at T1.5. As described with reference to the second sensor data signature above, the third sensor data signature may comprise one or more parameters. The second sensor data signature and the third sensor data signature may be comprised within the pre-event signature 42 corresponding to the first event 22. Therefore, when both the second sensor data signature and the third sensor data signature are detected, it may be determined that the first event 22 is predicted to occur. Alternatively, or in addition, it may be determined that the first event 22 is predicted to occur if only one of the second sensor data signature and the third sensor data signature is detected. Alternatively, or in addition, one or more combinations of the second sensor data signature and the third sensor data signature may be defined for one or more respective pre-event signatures corresponding to prediction of one or more respective events.

For example, the first event 22 may be an audible event, such as a sound from a heater. A light of the heater may turn on when the heater is switched on. Also, the heater may only start heating, and thus making the sound (the first event 22) a threshold time after the room temperature falls below a threshold temperature. For example, the threshold time may be thirty seconds, and the threshold temperature may be 10 degree Celsius. The heater may make a sound (start heating)

when the heater is on (light is on), and the temperature is below 10 degree Celsius. If the heater is on, but the temperature is not below 10 degree Celsius, the heater does not start heating, and therefore may not make a sound (first event 22 does not occur). If the temperature is below 10 degree Celsius, but the heater is not on (light is off), the heater does not start heating, and therefore may not make a sound (first event 22 does not occur). Therefore, the second sensor data plot 31 may show visual sensor data captured from the light of the heater, and the third sensor data plot 41 may show temperature sensor data captured with one or more temperature sensors (for example, comprised in a thermostat). As such, the second signal data plot 31 shows an example timing of the light turning on, such that the first event 22 may be predicted to occur at any time after the light is turned on. For example, the heater may be turned on any time before the first event 22, but the first event 22 will only occur thirty seconds after the temperature falls below 10 degree Celsius. A pre-event signature for the first event 22 (sound from the heater) may therefore comprise the second sensor data signature (light turned on) and the third sensor data signature (temperature falling below 10 degree Celsius).

As discussed earlier, the sensor data 2 may be collected using one or more sensors comprised in the user device 1 and/or one or more external devices. The sensor data may be used for determining sensor data signatures associated with an event, and for determining pre-event signatures. For example, the one or more sensors may comprise a microphone or microphone array for sensing sensor data 2 comprising audio signals. Alternatively, or in addition, the one or more sensors may comprise a camera may be used for sensing sensor data 2 comprising visual signals associated with visual events or audible events. It may be appreciated that the one or more sensors may comprise any other types of sensors, and are not limited to microphones or cameras.

Figure 5:
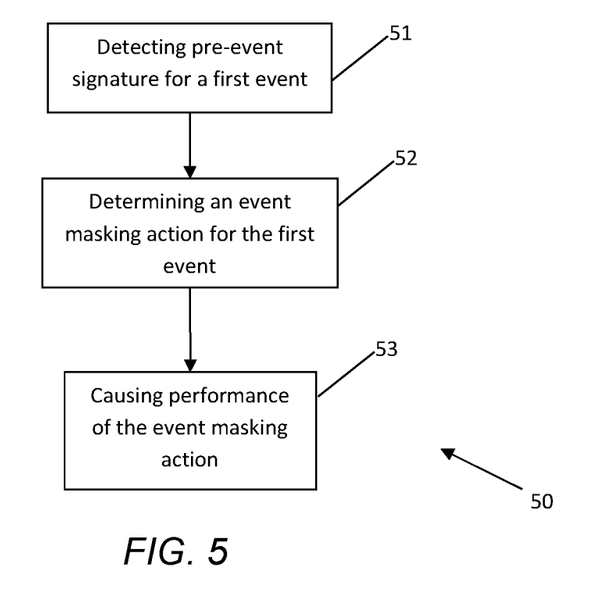
FIG. 5 is a flowchart showing an algorithm in accordance with an example embodiment.

FIG. 5 is a flowchart of an algorithm, indicated generally by the reference numeral 50, in accordance with an example embodiment.

At operation 51, a pre-event signature is detected for a first event. The pre-event signature may be indicative of a prediction of a first event (e.g. including the nature and the timing of the first event). The pre-event signature may comprise one or more of: an audible signature, a visual signature, an environmental signature (such as temperature, humidity etc.), and a haptic signature. The first event may be one or more of: a visual event, an audible event, a haptic event and an environmental event.

At operation 52, an event masking action is determined for the first event. The event masking action may be one or more of: a visual action, an audible action, a haptic action and an environmental action (such as turning on an air conditioning unit if the temperature is predicted to rise or turning on a humidifier if humidity is predicted to fall significantly).

At operation 53, the determined event masking action is caused to be performed in response to detecting the pre-event signature. Thus, event masking may be implemented by the algorithm 50 based on predicted properties of an event (e.g. the time and/or nature of the event). The use of prediction may provide a predictive masking system that is not reliant of reactive masking of events. Reactive masking may comprise performing masking action(s) after the event has already started. This may cause at least the beginning of the event to not be masked. In some scenarios, the beginning or an initial part of an event may be disruptive enough for causing disturbance to one or more users. In contrast, predictive masking allows performing masking action(s) before the event occurs, such that the beginning or initial part of the event is also masked from the one or more users. As such, the event may cause minimal disruption or disturbance to the one or more users, as the event is masked with the predictive masking action(s).

In an example embodiment, at operation 53, the event masking action may be caused to be performed by the user device 1, such that the event masking action is performed at the user device 1. Alternatively, or in addition, the user device 1 may cause the performance of the event masking action by causing another device to perform the event masking action. For example, the user device 1 may send one or more instructions to one or more other devices for performing the event masking action. For example, the event masking action comprises playing white noise in order to mask an audible event. The user device 1 may send an instruction to a speaker device, instructing the speaker device to play white noise. The speaker device may then perform the event masking action by playing the white noise.

At operation 51, the pre-event signature may be determined using a signature matching algorithm (e.g. making use of one or more models). For example, one or more sensor data may be sensed by one or more sensors, and the sensor data may be used for determining whether the sensor data matches with a pre-event signature (including one or more sensor data signatures). Information of a plurality of pre-event signatures may be stored in a pre-event signature database. A query may be sent to the pre-event signature database in order to determine whether the sensor data matches with any pre-event signatures stored in the pre-event signature database. A pre-event signature may therefore determined based, at least in part, on the sensor data matching. In an example embodiment, the sensor data is considered to match with the pre-event signature if the sensor data is within a threshold of the pre-event signature. For example, a similarity score may be determined, such that the similarity score is an indication of how similar a sensor data is to a pre-event signature. If a similarity score is within a threshold similarity score, the sensor data may be considered to match with the pre-event signature.

At operation 52, the event-masking action may be determined for masking the first event. The pre-event signature database (described above) may further comprise one or more events corresponding to the pre-event signatures. When the pre-event signature is determined at operation 51, the occurrence of a corresponding first event may be determined. An event masking action may be determined based on the first event, such that the event masking action may mitigate, cancel, or reduce some effects of the first event.

In an example embodiment, an event masking action may be specified for one or more events, and a plurality of event masking actions may be defined for a plurality of events, and the plurality of event masking actions may be stored in a database.

The masking operation determined in operation 52 may be of the same type as the event determined in operation 51 (e.g. a visual masking action may be used when the first event is a visual event, an audible masking action may be used when the first event is an audible event etc.). However, this is not essential to all example embodiments. For example, an environmental event (such as a change in light level) may be masked with an audible action or a visual action.

In one example embodiment, the first event is an audible event, and an event masking action comprises an audio suppression action. In one example, an audio suppression action is determined by sending a query to a database comprising ideal audio suppression actions for audible events. An audio suppression action may comprise one or more of audio masking and audio cancellation. For example, sound masking may be performed by generating a sound that may have a masking effect on the audible event. The sound may be generated using, for example, an artificial intelligence music generator, a white noise generator, a speech generator, or the like. For example, one or more properties of the generated sound may be configured based on one or more properties of the audible event, such that the audible event may be masked. In another example, audio cancellation may be performed by generating an audio output to cancel one or more disruptive sounds of the audible event. The audio for audio cancellation may be generated using directed audio systems, broadcast audio systems, headphones, or any other device that may be used for cancelling the sound of the audible event.

In one example, the audio for audio cancellation is generated at a location of a user. For example, the audible event may occur in a first room, and a user may be located in a second room. The user may be able to hear one or more sounds of the audible event. The audio cancellation may be performed by generating the audio at the second room. In another example, the audio for audio cancellation is generated at a location of the audible event. When the audible event occurs in the first room and the user is located in the second room, the audio cancellation may be performed by generating the audio at the first room. Performing audio cancellation at the location of the audible event may allow the audio of the audible event to be suppressed for one or more nearby users in locations other than the second room.

Figure 6:
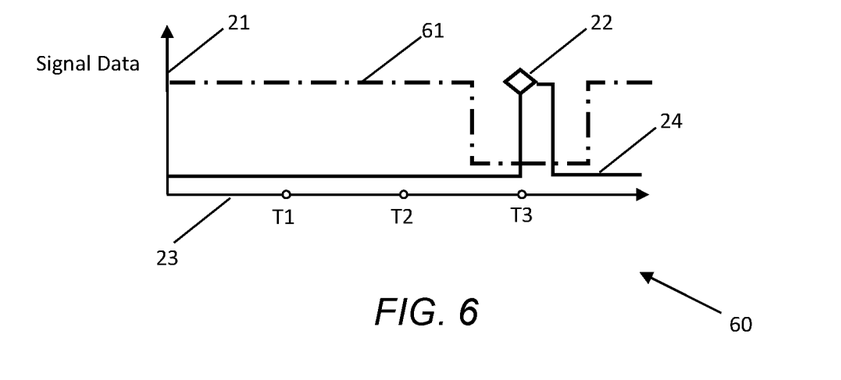
FIG. 6 is a plot of sensor data in accordance with an example embodiment.

FIG. 6 is a plot of signal data, the plot indicated generally by the reference numeral 60, in accordance with an example embodiment. The plot 60 shows the signal data axis 21, the time axis 23, first sensor data plot 24, and the first event 22, as shown in FIG. 2. The plot 60 further comprises a fourth signal data plot 61. The fourth signal data plot 61 may represent signals corresponding to an event masking action, as performed at operation 53 of FIG. 5. For example, the event masking action may start before the first event 22 is predicted to occur, and may end after the first event 22 is predicted to end. The event masking action is discussed in further detail in FIG. 9.

Figure 7:
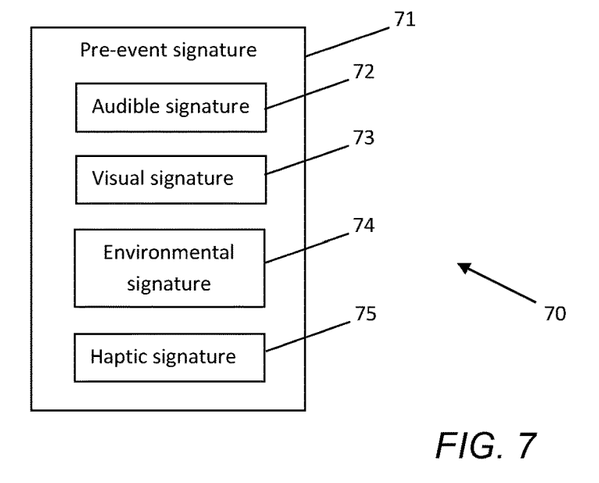
FIGS. 7 to 12 are block diagrams of systems in accordance with example embodiments.

FIG. 7 is a block diagram of a system, indicated generally by the reference numeral 70, in accordance with an example embodiment. System 70 illustrates that a pre-event signature 71 may comprise one or more of an audible signature 72, a visual signature 73, an environmental signature 74, and a haptic signature 75.

For example, the audible signature 72 may comprise a specific frequency composition, amplitude, time of the sound, direction at which a sound originates, pattern of a sound wave, or any other detail that may define one or more sounds for the audible signature. The visual signature 73 may comprise information regarding any visual changes, such as a light turning on, a colour of the light, brightness of the light, a light turning off, a light flashing or blinking, any physical movement of any object, or the like. The environmental signature 74 may comprise information regarding any environmental changes, such as changes in temperature, changes in humidity, changes in air composition (for example, presence of smoke), changes in odour, or the like. The haptic signature 74 may comprise information regarding any haptic changes, such as vibrations, frequency of the vibrations, amplitude of the vibrations, time of the vibration, device at which vibration originates, or the like.

In one example, environmental changes may include any changes in the relevant environment that may or may not include a visual, audible or haptic change.

In one example, a pre-event signature may comprise a combination of one or more of an audible signature 72, a visual signature 73, an environmental signature 74, and a haptic signature 75. For example, a thunderstorm may cause an audible change (sound of the thunder), a visual change (light from the lightning), environmental change (electrical discharge), and haptic change (vibrations). Alternatively, or in addition, an environmental signature comprising information regarding any environmental changes may also fall within a scope of a visual, audible, and/or haptic signature. For example, a rise in humidity (environmental signature) may be accompanied by fog (visual signature). As such, any changes may correspond to one or more of a visual, audible, haptic, and/or environmental signature.

In an example embodiment, pre-event signatures are not limited to signatures which occur before the occurrence of the first event 22, such that the pre-event signature may correspond to sensor data received during or after the first event 22. For example, a pre-event signature associated with an audible event may not necessarily be an audible signature and may be a side channel signature, for example, a radio-frequency signature, or may comprise sensor data from a visual microphone. In such scenarios, the side channel signature may have a speed faster than the speed of the audible event. The pre-event signature may therefore occur during or after the sound of the audible event is generated, but the sensor data related to the pre-event signature may be received before the audio signals of the audible event are received. As the sensor data related to the pre-event signature may be received before the audio signals of the audible event are received, an event masking action may be performed for masking, cancelling, or reducing effects of the audible event.

The pre-event signature 71 for a specific event may comprise a pattern or combination of the one or more of the audible signature 72, visual signature 73, environmental signature 74, and haptic signature 75.

Figure 8:
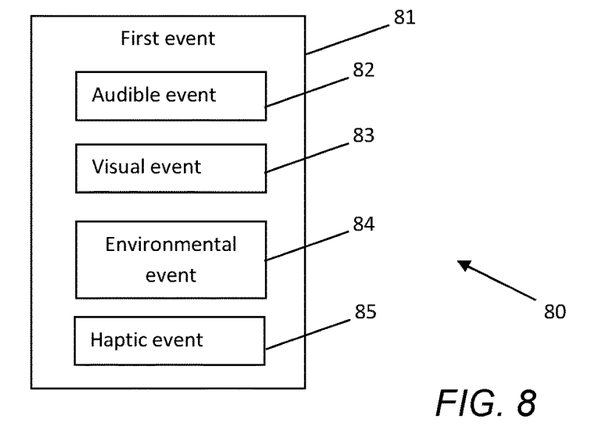

FIG. 8 is a block diagram of a system, indicated generally by the reference numeral 80, in accordance with an example embodiment. System 80 illustrates that the first event 81 (similar to the first event 22) may comprise one or more of an audible event 82, visual event 83, environmental event 84, and a haptic event 85. For example, an audible event 82 may be a noise event, such as a disruptive noise that may cause disturbance to a user of the user device 1 and/or one or more other users hearing the disruptive noise. The visual event 83 may be an event that causes disturbance to the user or one or more users seeing the event. The visual event 83 may be, for example, a light turning on, a light turning off, a distracting movement of an object, or any other event that may be disruptive. The environmental event 84 may be, for example, changes in temperature, changes in humidity, changes in smell, or any other events that may be disruptive to the user and/or one or more other users. The haptic event 85 may be, for example, a vibration, a movement of an object, or any other disruptive event that the user or one or more other users may feel.

In one example, the first event 22 may be a combination of one or more of the audible event 82, visual event 83, environmental event 84, and haptic event 85. For example, a lightning event (first event 22) may be a combination of a thunder (audible event 82), a flash of light (visual event 83), electrical discharge (environmental event 84), and vibrations (haptic event 85).

In one example, an environmental event comprising any environmental changes may also fall within a scope of a visual, audible, and/or haptic event. Environmental changes may include changes in the environment that may or may not include an audible, visual, or haptic change. For example, a rise in humidity (environmental event) may be accompanied by fog (visual event). As such, any changes may correspond to one or more of a visual, audible, haptic, and/or environmental event.

Figure 9:
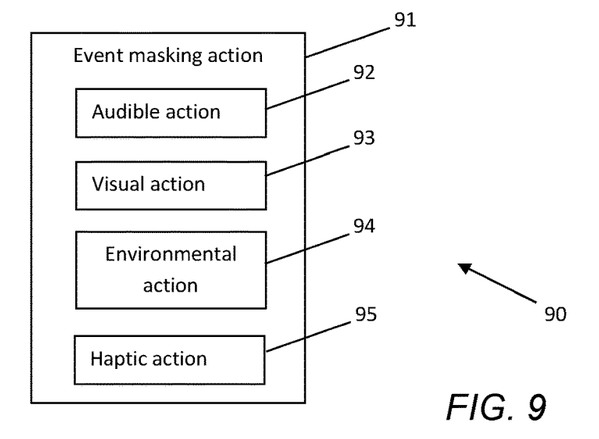

FIG. 9 is a block diagram of a system, indicated generally by the reference numeral 90, in accordance with an example embodiment. System 90 illustrates that the event masking action 91 may comprise one or more of an audible action 92, visual action 93, environmental action 94, and a haptic action 95.

In an example embodiment, the event masking action may correspond to the type of event, i.e. an audible action 92 may be performed before an audible event 82; a visual action 93 may be performed before a visual event 83; an environmental action 94 may be performed before an environmental event 84; and a haptic action 95 may be performed before a haptic event 85.

For example, an audible action 92 may comprise generating an audio signal (such as white noise, or noise cancelling audio) for masking an audible event (first event 22).

A visual action 93 may comprise generating a light for reducing effects of a visual event or creating a visual barrier between the user and the visual event. For example, the first event 22 may be a flashing light in a room, and the event masking action may be to adjust lighting of the room in order to make the user or one or more other users in the room less distracted or disturbed by the flashing light.

An environmental action 94 may comprise, for example, adjusting temperature, adjusting humidity, generating a smell, or the like. For example, the first event 22 may be an outside temperature rising above a desired level. If the first event 22 is predicted to occur (e.g. the outside temperature is predicted to rise), an event masking action (such as the environmental action 94) may be performed by turning on an air conditioning system (before the outside temperature rises) for lowering the temperature, such that the user or one or more other users in the room are not disturbed by the rise in the outside temperature. Similarly, the first event 22 may be a fall in humidity. If the first event 22 is predicted to occur (e.g. the humidity is predicted to fall, perhaps below desired level), an event masking action (such as the environmental action 94) may be performed by turning on a humidifier.

A haptic action 95 may comprise, for example, a vibration, a movement, applying heating to a body, applying cooling to a body or the like. For example, the first event 22 may be a jolt from removing a car seat from a car seat holder in a car, which may cause a baby (user) sitting in the car seat to be disturbed or woken up from sleep. The first event 22 may be predicted to occur when a door of the car is opened (pre-event signature). An event masking action may comprise a haptic action 95. The haptic action 95 may be performed by gradually increasing a vibration of the car seat, such that the movement of the car seat gradually increases from a low level to a high level. This may reduce the jolt from removing the car seat, such that the disturbance to the baby is minimized, and the baby's perception of the jolt is reduced. In another example, the first event 22 may be a fall in room temperature which may cause a user to feel cold. The first event 22 may be predicted to occur when a window of the room is open and an outside temperature is below a threshold (pre-event signature). An event masking action may comprise a haptic action 95, which haptic action 95 may be performed by applying heating to body of the user (for example, via an electric heating blanket).

In an example embodiment, the event masking action may be different than the type of the event, e.g. any of an audible action 92, visual action 93, environmental action 94, and haptic action 95 may be performed before any of the audible event 82, visual event 83, environmental event 84, and haptic event 85. For example, a first event 22 is an audible event 82, such as a disruptive noise. An event masking action, such as a visual action 93, may be performed for distracting the user or one or more other users from the first event 22 (i.e. the disruptive noise). In another example, the first event 22 is a visual event, such as a sudden bright light turning on, which may be disturbing to a user (for example, a user that feels discomfort due to light sensitivity). If the first event 22 is predicted to occur, an event masking action may include a haptic action 95, which haptic action 95 may comprise application of pressure on one or more pressure points of the user's body. For example, application of pressure to the temples of the head (for example via a hat or headband comprising an inflatable bladder) may assist in mitigating discomfort of the user due to light sensitivity prior to the user being exposed to the sudden bright light.

Figure 10:
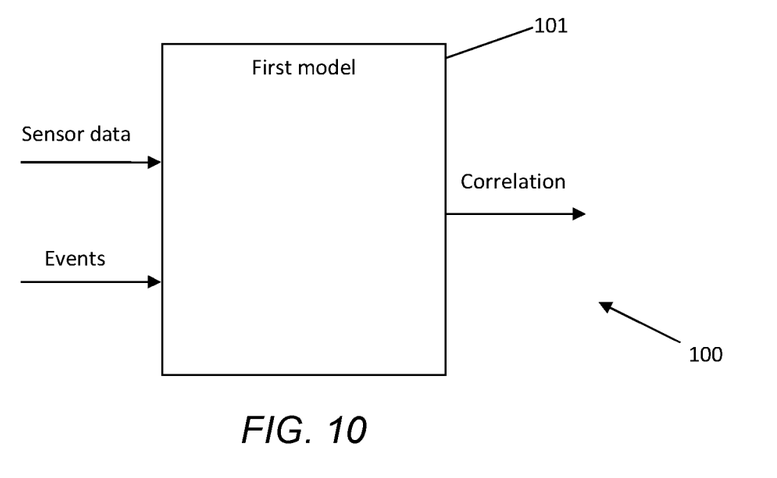

FIG. 10 is a block diagram of a system, indicated generally by the reference numeral 100, in accordance with an example embodiment. The system 100 comprises a first model 101, which model may be used to determine a pre-event signature.

The first model 101 receives as inputs a plurality of sensor data, and information of one or more events. The first model 101 may be used for determining a correlation between one or more sensor data features and one or more events. The one or more sensor data features may be determined from the sensor data inputs.

In an example embodiment, the pre-event signature for one or more events may be stored in a database, such as the first model 101. The first model 101 may be trained over a large time period with a plurality of sensor data (for example, a large dataset for events and sensor data that may be comprised within a pre-event signature for one or more events). In an example embodiment, the first model 101 is trained by determining a correlation between one or more sensor data features and one or more events, such as the first event 22. One or more sensor data features may be associated with an event, such as the first event 22, if a uniqueness or repeatability of the one or more sensor data features in relation to the first event 22 is higher than a first threshold. The uniqueness of the one or more sensor data features in relation of the first event 22 may be higher than the first threshold if the occurrence of the sensor data features is generally followed by the first event 22. The repeatability of the one or more sensor data features in relation of the first event 22 may be higher than the first threshold if the occurrence of the first event 22 is generally preceded by the occurrence of the one or more sensor data features. The first model 101 may then be trained using the sensor data features associated with the first event. The first model 101 may, for example, be trained using machine-learning principles. The first model 101 may also be trained using unsupervised learning, for example, during the use of the first model.

By way of example, the first event 22 may be an audible event, such as a sound generated at a heater. A light of the heater may turn on a threshold time before the first event 22 occurs. The turning on of the light may be a sensor data feature. The first model 101 may be trained for the first event 22 (i.e. sound from the heater) over a training time period. During the training time period, the uniqueness of the sensor data feature of the light turning on may be determined based on whether, generally (for example the majority of the times when the light of the heater turns on), the light turning on is followed by the sound being generated at the heater. The uniqueness of the sensor data feature may be higher than the first threshold if it is determined that, generally (for example, the majority of the times when the light is turned on), the light turning on is followed by the sound being generated at the heater. The repeatability of the signal data feature of the light turning on may be determined based on whether, generally (for example the majority of the times when the sound is generated at the heater), the sound being generated at the heater is preceded by the light turning on. The repeatability of the signal data feature may be higher than the first threshold if it is determined that, generally (for example, the majority of the times that the sound is generated at the heater), the sound being generated at the heater is preceded by the light turning on. It may be appreciated that the training of the first model 101 may continue after the training time period, such that the first model 101 may be refined and/or updated during normal use of the first model 101. Alternatively, or in addition, the first model may be trained using unsupervised learning, such that the first model 101 may not need to be pre-trained. A user may start using an apparatus of the above example embodiments, and the first model 101 may start learning correlations between sensor data features and events while the apparatus is in use. For example, the first model 101 may comprise a neural network. One or more parameters of the first model 101 may be updated and/or refined based on machine learning principles in an unsupervised learning and/or by manual inputs from the user.

Figure 11:
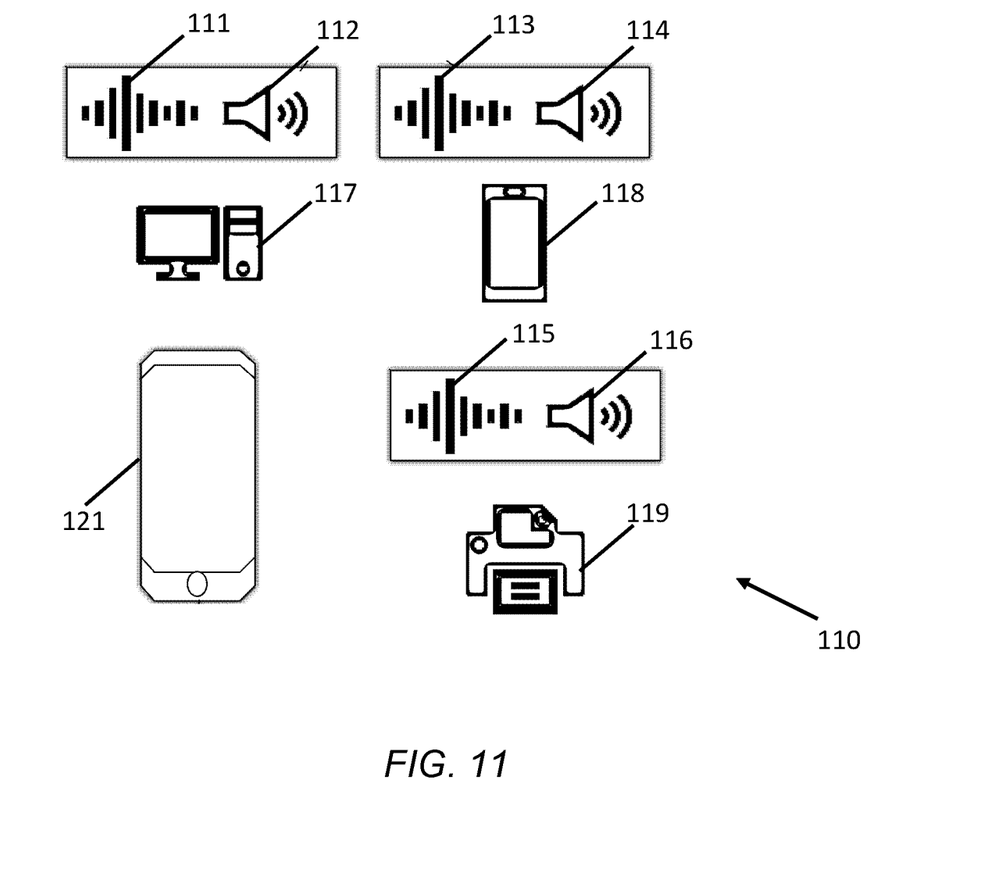

FIG. 11 is a block diagram of a system, indicated generally by the reference numeral 110, in accordance with an example embodiment. System 110 comprises a user device 121, a first device 117, a second device 118, and a third device 119. The first device 117, the second device 118, and the third device 119 may generate one or more sounds or noises that may be disruptive or may cause disturbance to a user of the user device 121, or one or more other users. For example, the first device 117 may generate a noise, which may be a first event 112. A pre-event signature 111 is determined to be indicative of a prediction of the first event 112. The second device 118 may generate a noise, which may be a second event 114. A pre-event signature 113 is determined to be indicative of a prediction of the first event 114. The third device 119 may generate a noise, which may be a third event 116. A pre-event signature 115 is determined to be indicative of a prediction of the third event 116. The user device 121 may receive sensor data for each of the pre-event signatures 111, 113, and 115, and may thus predict the occurrence of the first event 112, the second event 114, and the third event 116. As the user device 121 predicts the occurrence of the events, the user device 121 may perform one or more event masking actions to mask one or more of the first event 112, the second event 114, and the third event 116, as shown in FIG. 12.

Event masking actions may serve to mask one or more events from all users who are able to perceive them. For example, adjusting the light level in a room in order to mask a visual event within the room may provide masking for all users present in the room and therefore able to see the visual event. However, in some embodiments masking may be performed for just a subset of users who would be able to perceive the event being masked. For example, it may be desirable to mask the sound of an event to all but a single user. An example of such a case might be a bedroom in which two or more users are sleeping and where just one of those users wishes to experience an event—for example where only one user wishes to be woken by an alarm clock and the other users wish to continue sleeping.

Figure 12:
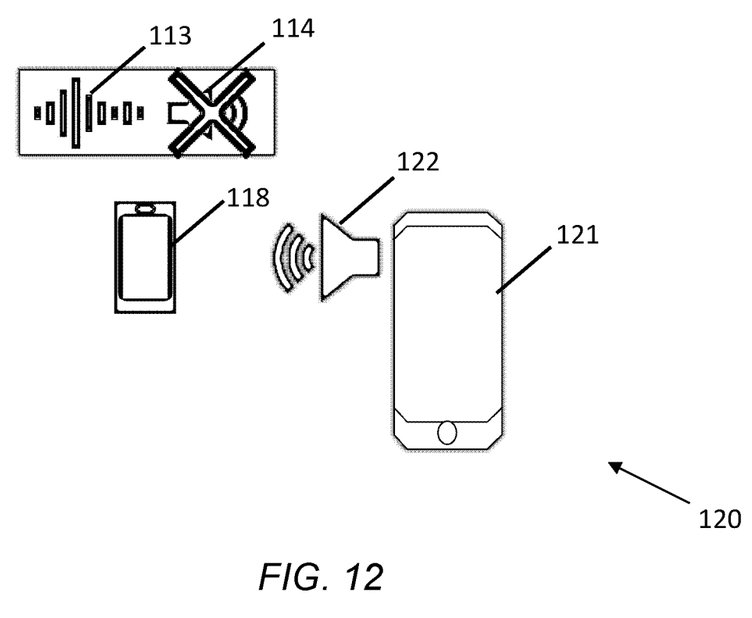

FIG. 12 is a block diagram of a system, indicated generally by the reference numeral 120, in accordance with an example embodiment. The user device 121 may perform an event masking action 122 in order to mask the second event 114 (i.e. a noise generated by the second device 118).

The event masking action 122 may be an audible action, such as generating a sound, for example, using one or more speakers of the user device 121, one or more external speakers, or one or more headphones or earphones of the user and/or other users. The generated sound may cause masking, cancelling, mitigating, or reducing the effect on the user or other users of the noise generated by the device 118.

Figure 13:
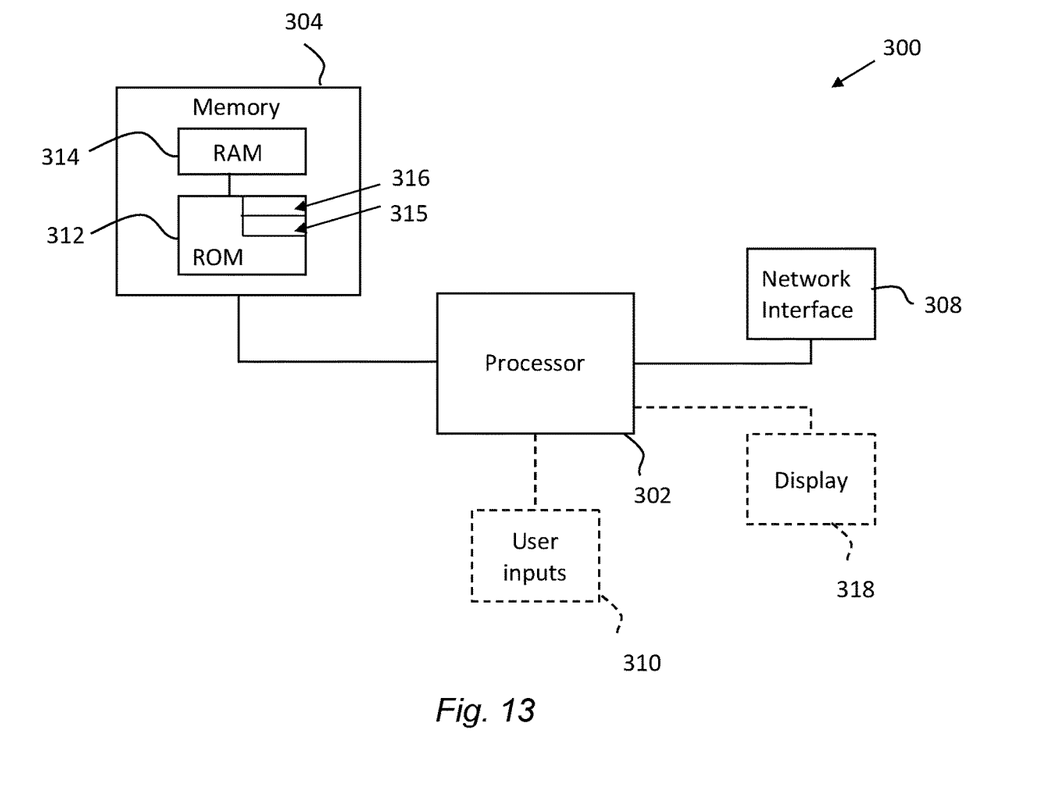
FIG. 13 is a block diagram of components of a system in accordance with an exemplary embodiment.

For completeness, FIG. 13 is a schematic diagram of components of one or more of the modules for implementing the algorithms described above, which hereafter are referred to generically as processing systems 300. A processing system 300 may have a processor 302, a memory 304 coupled to the processor and comprised of a RAM 314 and ROM 312, and, optionally, viewer inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithm 50.

The processor 302 may take any suitable form. For instance, it may be a microcontroller, plural microcontrollers, a processor, or plural processors. Processor 302 may comprise processor circuitry.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 14A:
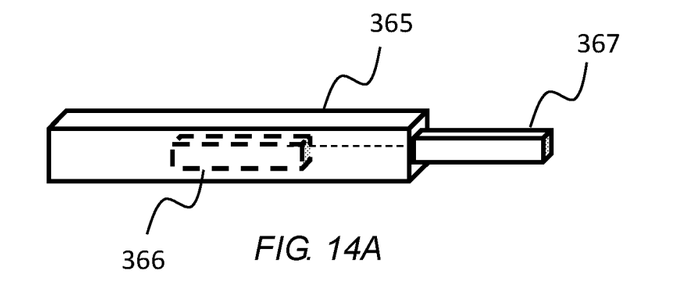
FIGS. 14A and 14B show tangible media, respectively a removable non-volatile memory unit and a Compact Disc (CD) storing computer-readable code which when run by a computer perform operations according to example embodiments.
Figure 14B:
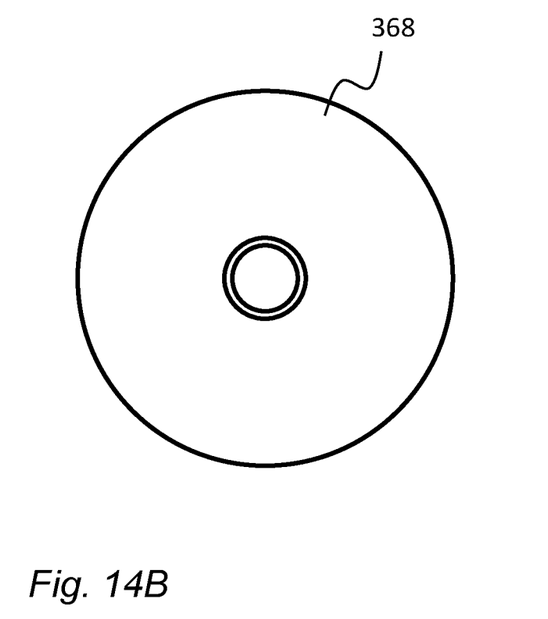

FIG. 14A and FIG. 14B show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 5 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code, the at least one memory and the computer program code configured, with the at least one processor, to cause the apparatus to:
   detect a pre-event signature based on sensor data by querying a pre-event signature database to determine whether the sensor data matches at least one of a plurality of pre-event signatures stored in the pre-event signature database, wherein the pre-event signature is indicative of a prediction of a first event, and wherein the sensor data is determined to match the at least one of a plurality of pre-event signatures based on a similarity score of the sensor data and the at least one of a plurality of pre-event signatures satisfying a threshold, and wherein respective ones of the plurality of pre-event signatures comprise one or more parameters comprising at least an associated time period during which the first event is predicted to occur, wherein the associated time period comprises a time period after the pre-event signature has occurred;
   determine an event masking action corresponding to the first event; and
   cause performance, in response to the detection of the pre-event signature, of the event masking action for masking the first event before the associated time period has occurred, wherein the first event occurs during the event masking action, and wherein the event masking action reduces or masks an effect of the first event.

2. The apparatus as claimed in claim 1, wherein the pre-event signature comprises one or more of: an audible signature, a visual signature, an environmental signature, or a haptic signature.

3. The apparatus as claimed in claim 1, wherein the event masking action is one or more of: a visual action, an audible action, a haptic action, or an environmental action, and wherein the first event is one or more of: a visual event, an audible event, a haptic event or an environmental event.

4. The apparatus as claimed in claim 1, wherein the first event comprises an audible event and the event masking action comprises an audio suppression action.

5. The apparatus as claimed in claim 1, wherein the pre-event signature is determined using a first model comprising a machine learning model.

6. The apparatus as claimed in claim 5, wherein the at least one memory and the computer program code are configured, with the at least one processor, to cause the apparatus to:
   train the first model, wherein training the first model comprises determining a correlation between one or more sensor data features and the first event.

7. The apparatus as claimed in claim 6, wherein the at least one memory and the computer program code are configured, with the at least one processor, to cause the apparatus to:
   associate one or more sensor data features with the first event, responsive to at least one of a uniqueness or a repeatability of the one or more sensor data features in relation to the first event is higher than a first threshold, wherein the first model is trained using sensor data features associated with the first event.

8. The apparatus as claimed in claim 1, wherein the first event comprises an environmental event, and wherein the environmental event comprises a change in temperature, a change in humidity, or a change in smell.

9. The apparatus as claimed in claim 1, wherein the first event comprises a haptic event, and wherein the haptic event comprises a vibration or a movement of an object.

10. The apparatus as claimed in claim 1, wherein the first event comprises a visual event, and wherein the visual event comprises a light turning on, a light turning off, or a movement of an object.

11. The apparatus as claimed in claim 1, wherein the first event comprises a combination of two or more of: a visual event, an audible event, a haptic event, or an environmental event.

12. The apparatus as claimed in claim 1, wherein the one or more parameters further comprise a start time and an end time associated with the first event, a frequency associated with the first event, a wavelength associated with the first event, or an amplitude associated with the first event.

13. The apparatus as claimed in claim 1, wherein the event masking action comprises a same type as the first event, and wherein the at least one memory and the computer program code are configured, with the at least one processor, to cause the apparatus to:
responsive to the first event comprising a visual event, cause performance of the event masking action comprising a visual action;
responsive to the first event comprising an audible event, cause performance of the event masking action comprising an audible action;
responsive to the first event comprising a haptic event, cause performance of the event masking action comprising a haptic action; and
responsive to the first event comprising an environmental event, cause performance of the event masking action comprising an environmental action.

14. The apparatus as claimed in claim 1, wherein reducing the effect of the first event comprises cancelling the first event.

15. The apparatus as claimed in claim 1, wherein the event masking action reduces a perception of the first event by one or more users.

16. A method comprising:
detecting a pre-event signature based on sensor data by querying a pre-event signature database to determine whether the sensor data matches at least one of a plurality of pre-event signatures stored in the pre-event signature database, wherein the pre-event signature is indicative of a prediction of a first event, and wherein the sensor data is determined to match the at least one of a plurality of pre-event signatures based on a similarity score of the sensor data and the at least one of a plurality of pre-event signatures satisfying a threshold, and wherein respective ones of the pre-event signatures comprise one or more parameters comprising at least an associated time period during which the first event is predicted to occur, wherein the associated time period comprises a time period after the pre-event signature has occurred;
determining an event masking action corresponding to the first event; and
causing performance, in response to the detection of the pre-event signature, of the event masking action for masking the first event before the associated time period has occurred, wherein the first event occurs during the event masking action, and wherein the event masking action reduces, masks, or cancels an effect of the first event.

17. The method as claimed in claim 16, wherein:
the first event is one or more of: a visual event, an audible event, a haptic event or an environmental event; and
the event masking action is one or more of: a visual action, an audible action, a haptic action or an environmental action.

18. The method as claimed in claim 16, wherein the pre-event signature is determined using a first model, and wherein the method further comprises:
training the first model based on at least a correlation between one or more sensor data features and the first event.

19. The method as claimed in claim 16, wherein the first event comprises an audible event and the event masking action comprises an audio suppression action.

20. A non-transitory computer-readable medium having stored thereon computer-instructions for causing an apparatus to perform at least the following:
detecting a pre-event signature based on sensor data by querying a pre-event signature database to determine whether the sensor data matches at least one of a plurality of pre-event signatures stored in the pre-event signature database, wherein the pre-event signature is indicative of a prediction of a first event, and wherein the sensor data is determined to match the at least one of a plurality of pre-event signatures based on a similarity score of the sensor data and the at least one of a plurality of pre-event signatures satisfying a threshold, and wherein respective ones of the plurality of pre-event signatures comprise one or more parameters comprising at least an associated time period during which the first event is predicted to occur, wherein the associated time period comprises a time period after the pre-event signature has occurred;
determining an event masking action corresponding to the first event; and
causing performance, in response to the detection of the pre-event signature, of the event masking action for masking the first event before the associated time period has occurred, wherein the first event occurs during the event masking action, and wherein the event masking action reduces, masks, or cancels an effect of the first event.

* * * * *